United States Patent [19]

Saito

[11] Patent Number: 5,008,686
[45] Date of Patent: Apr. 16, 1991

[54] OPTICAL SCANNING DEVICE FOR SCANNING A PREDETERMINED SURFACE WITH A PLURALITY OF LIGHT BEAMS

[75] Inventor: Hiroshi Saito, Kawasaki, Japan

[73] Assignee: Canon Kabushiki Kaisha, Tokyo, Japan

[21] Appl. No.: 394,542

[22] Filed: Aug. 16, 1989

[30] Foreign Application Priority Data

Aug. 19, 1988 [JP] Japan .................................. 63-206043

[51] Int. Cl.$^5$ .............................................. G01D 9/00
[52] U.S. Cl. ..................................... 346/108; 355/233
[58] Field of Search ................. 346/108, 107 R, 76 L; 346/160; 358/296, 300, 302; 355/233, 234; 250/216

[56] References Cited

U.S. PATENT DOCUMENTS 4,316,665  2/1982  Mochizuki et al. ...................... 355/1
4,796,038  1/1989  Allen et al. ............................ 346/108
4,864,326  9/1989  Kawamura et al. ................. 346/108

FOREIGN PATENT DOCUMENTS 57-22218  2/1982  Japan .
61-15119  1/1986  Japan .

Primary Examiner—Mark J. Reinhart
Attorney, Agent, or Firm—Fitzpatrick Cella Harper & Scinto

[57] ABSTRACT

An optical scanning device comprises a light source unit having a plurality of light emitting portions arranged in the sub scanning direction, an optical system for directing a plurality of light beams from the light source unit onto a predetermined surface, and a deflector for deflecting the plurality of light beams from the light source unit and scanning them on the predetermined surface. In the optical scanning device, the following condition is satisfied:

$$0 < |\beta| \leq 2,$$

where $\beta$ is the imaging lateral magnification of the optical system in the sub scanning direction.

8 Claims, 5 Drawing Sheets

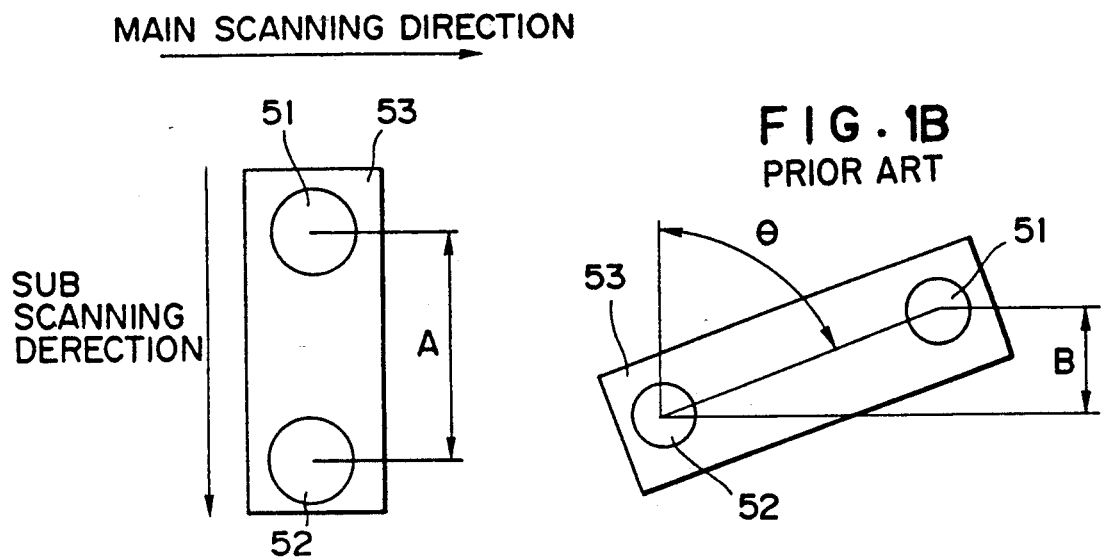
FIG. 1A
PRIOR ART
FIG. 1B
PRIOR ART
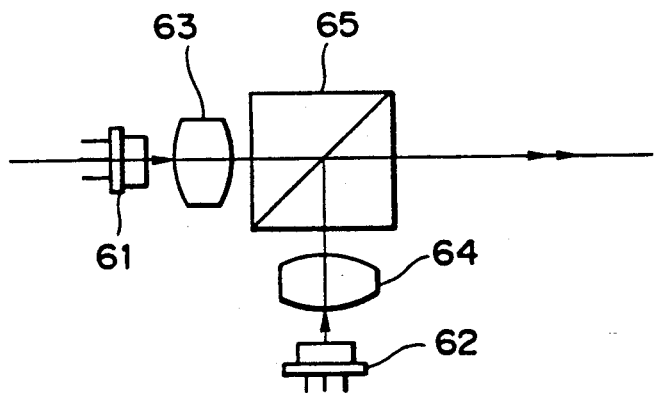
FIG. 2
PRIOR ART

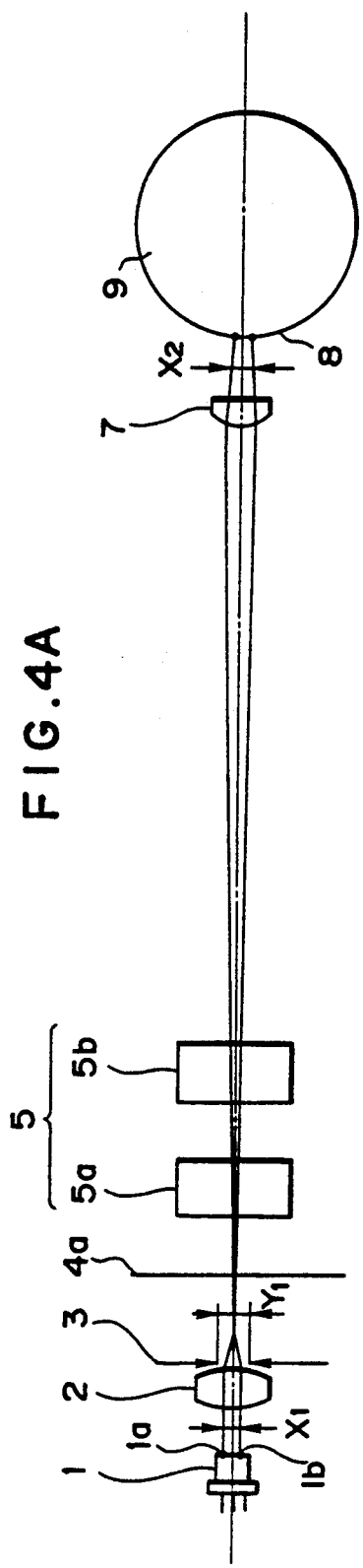
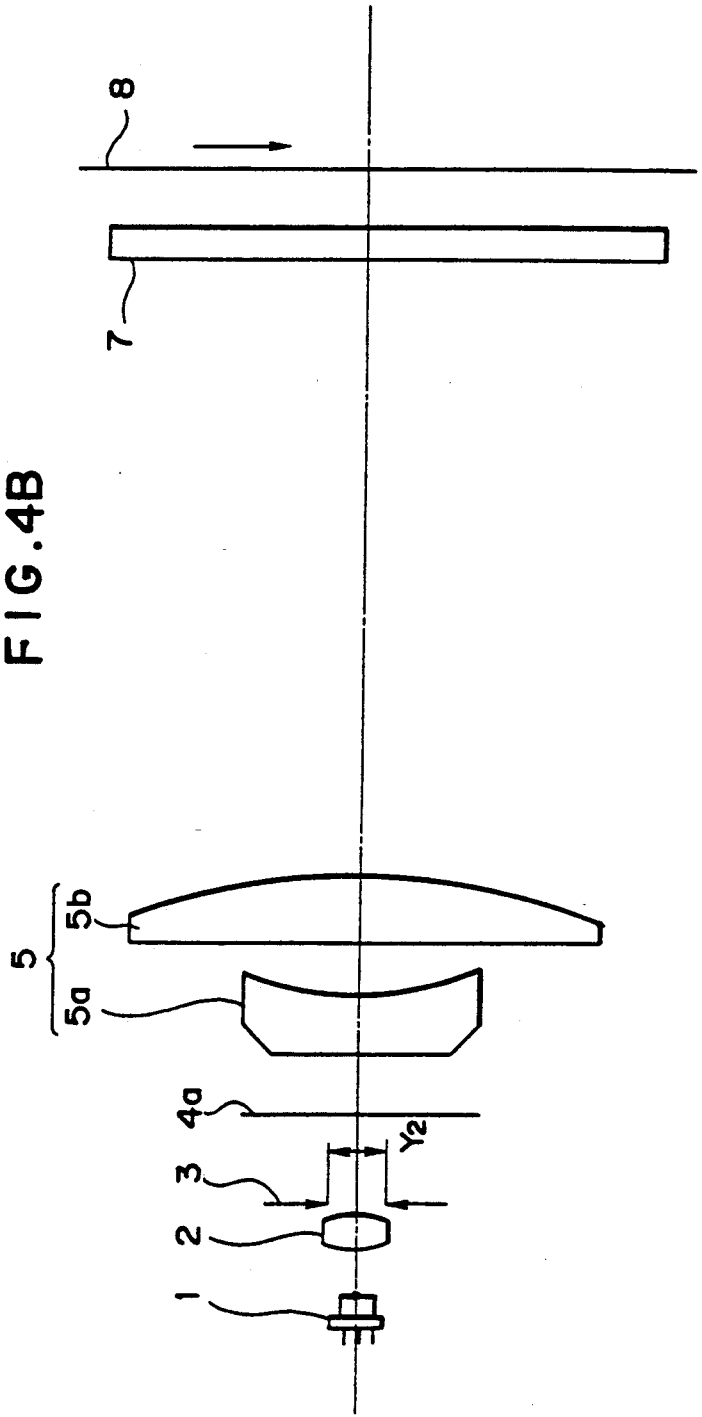
FIG.4A
FIG.4B

OPTICAL SCANNING DEVICE FOR SCANNING A PREDETERMINED SURFACE WITH A PLURALITY OF LIGHT BEAMS

BACKGROUND OF THE INVENTION

1. Field of the Invention

This invention relates to an optical scanning device, and in particular to an optical scanning device suitable for use in an apparatus such as a color laser beam printer having an electrophotographic process which is adapted to optically scan a surface to be scanned which is an image carrier by the use of a plurality of laser beams.

2. Related Background Art

Heretofore, in the optical scanning device of a color laser beam printer (a color LBP) or the like, the surface of an image carrier has been optically scanned by the use of a plurality of laser beams to thereby effect reading-in or reading-out of an image.

For example, in U.S. Pat. No. 4,253,102, as shown in FIGS. 1A and 1B of the accompanying drawings, a substrate 53 is rotated by an angle $\theta$ in the direction of arrow by the use of a so-called monolithic semiconductor laser having a plurality of light emitting portions 51 and 52 provided on the substrate 53, whereby the pitch in the sub scanning direction perpendicular to the main scanning direction is changed to thereby adjust the line density of writing-in. That is, in FIG. 1A, the pitch A of the light emitting portions 51 and 52 is made into a pitch B by rotating the substrate 53 by the angle $\theta$. This method has suffered from the problem that it is difficult to adjust the interval between a plurality of light beams spaced apart from one another and the laser beam does not enter symmetrically with respect to a scanning system and therefore bending of the scanning line on the scanning surface and curvature of the image field occur and optical aberration becomes asymmetrical between light beams.

In Japanese Laid-Open Patent Application No. 61-15119, as shown in FIG. 2 of the accompanying drawings, laser beams from two laser oscillators 61 and 62 are collimated by collimator lenses 63 and 64, respectively, whereafter they are directed to a half prism 65 and combined together, and directed to a light deflector, not shown, to thereby accomplish optical scanning.

This method has suffered from the problem that where the pitch in the sub scanning direction is to be adjusted finely, the adjustment of the directions of the laser beams is difficult and therefore the adjusting mechanism becomes complex and the interval between the plurality of laser beams is fluctuated by the fluctuation of the environment.

Japanese Laid-Open Patent Application No. 57-22218 discloses an optical scanning device as shown in FIG. 3 of the accompanying drawings wherein use is made of a semiconductor laser array comprising a plurality of light emitting sources (10a, 10b) arranged in a direction parallel to a joined surface. the direction of arrangement of said array is disposed so as to be orthogonal to the plane of deflection of the light beams and use is made of the plurality of light beams from said semiconductor laser array which scan adjacent scanning lines 10a' and 10b' at a time using a plurality of beam spots arranged in a direction orthogonal to the scanning direction of said light beams. The light beams pass through an objective lens 12 of a rotation-symmetrical system, an anamorphic lens 11 having different refractive powers in directions orthognal to each other, a rotatable polygonal mirror 13, a rotation-symmetrical lens 14, and an anamorphic lens having different refractive powers in directions orthogonal to each other. Also, in this optical scanning device, the imaging magnification of the imaging optical system from the laser array to the surface to be scanned in the plane of deflection of the light beams is made greater than the imaging magnification in a plane orthogonal to the plane of deflection of the light beams and containing the optic axis of the imaging optical system. However, but no mention is made of the magnitude of the imaging magnification in the plane orthogonal to the plane of deflection of the light beams and containing the optic axis of the imaging optical system. Here, the plane of deflection refers to the light beam plane formed with the lapse of time by the light beams deflected by the deflecting-reflecting surface of a deflector.

Generally, when considering the stability against the fluctuation of the environment, it is better to provide the plurality of light emitting portions on a monolithic element. In this case, it is better to make the distance between the light emitting portions great to a certain extent to avoid, for example, thermal and electrical interferences therebetween in order to permit the light emitting portions to operate independently of each other. In many cases, this distance is of the order of 50 $\mu$m to 100 $\mu$m.

On the other hand, in many optical scanning devices, the light emitting portion of the laser oscillator and the scanning surface are maintained in substantially conjugate relationship. The lateral magnificant at this time is generally set to the order of $\pm 10$–40 times from the viewpoint of the utilization efficiency of the laser beam, the spot diameter and the size of the entire device.

Accordingly, when the interval between the laser beams in the sub scanning direction is 100 $\mu$m, the interval on the scanning surface is on the order of 1–5 mm.

In the ordinary LBP, the adjacent line densities must be of the order of 0.2–0.04 mm and therefore, as previously described, the substrate had to be rotated by a predetermined angle to thereby narrow the pitch of the light emitting portions.

This has led to the problem that, as previously noted, bending of the scanning line and curvature of image the field occur to reduce the optical performance.

SUMMARY OF THE INVENTION

It is an object of the present invention to provide an optical scanning device having good optical performance in which the bending of the scanning line and curvature of the image field which have heretofore been problems when a plurality of light beams are used, by utilizing an anamorphic optical system in a portion of a scanning optical system. The the scanning optical system is constructed so that the refractive powers in the main scanning direction and the sub scanning direction of the scanning optical system differ from each other, and particularly, the image lateral magnifications of the light emitting portion of a laser oscillator and a surface to be scanned in the sub scanning direction are made as small as possible. This enables a multibeam light source having a plurality of light emitting portions formed on a monolithic element to be used effectively.

A feature of the optical scanning device of the present invention is that each optical element is constructed so that when a plurality of laser beams emitted from a plurality of light emitting portions arranged in the sub scanning direction are directed by an optical system onto a surface to be scanned and the plurality of laser beams from said plurality of light emitting portions are deflected by a deflector to thereby scan the surface to be scanned, the imaging lateral magnification $\beta$ in the sub scanning direction on the surface to be scanned by the optical system disposed in an optical path leading from said light emitting portions to the surface to be scanned is $$0 < |\beta| \leq 2. \tag{1}$$

BRIEF DESCRIPTION OF THE DRAWINGS

FIGS. 1A and 1B illustrate a monolithic multibeam light source according to the prior art.

FIG. 2 illustrates a portion of a conventional optical scanning device using a plurality of beams.

FIGS. 4A and 4B are cross-sectional views of the essential portions of an embodiment of the present invention when developed in the sub scanning direction and the main scanning direction, respectively.

DESCRIPTION OF THE PREFERRED EMBODIMENTS

Figure 3:
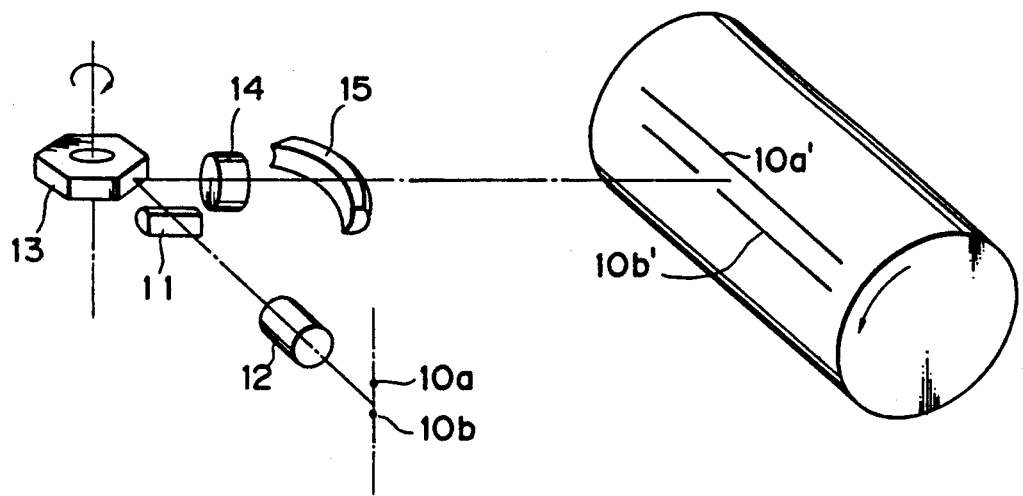
FIG. 3 illustrates a conventional optical scanning device using a plurality of beams.

FIGS. 4A and 4B are schematic views of essential portions of the first embodiment taken in cross-section perpendicular to the plane of deflection and in a plane parallel to the plane of deflection, respectively. The plane of deflection refers to the light beam plane formed with the lapse of time by a light beam deflected by the deflecting-reflecting surface of a deflector. The main scanning direction refers to the direction in which the light beam deflected by the deflecting-reflecting surface of the deflector scans a surface to be scanned, and the sub scanning direction refers to the direction perpendicular to the main scanning direction.

In FIGS. 4A and 4B, the reference numeral 1 designates a semiconductor laser having two light emitting portions 1a and 1b disposed at an interval $x_1$ in the sub scanning direction on a common monolithic substrate. The reference numeral 2 denotes a collimator lens which collimates two laser beams emitted from the two light emitting portions 1a and 1b at predetermined angles, respectively. The reference numeral 3 designates a stop which shapes the light beams from the collimator lens 2 to make the spot diameters of the laser beams on a surface 8 to be scanned which will be appropriate, as described later.

The reference character 4a schematically shows one deflecting-reflecting surface of a rotatable polygonal mirror as a light deflector, and the laser beams are reflected and deflected by the deflecting-reflecting surface 4a. The reference numeral 5 denotes a scanning lens having the f-$\theta$ characteristic, and having lenses 5a and 5b. The scanning lens 5 is afocal in the sub scanning direction, as shown in FIG. 4A, and has a refractive power exhibiting the f-$\theta$ characteristic in the main scanning direction, as shown in FIG. 4B. The reference numeral 7 designates a cylindrical lens which is an optical system having a refractive power only in the sub scanning direction and afocal in the main scanning direction. A light beam parallel in the sub scanning direction enters the cylindrical lens 7. The cylindrical lens 7 has the function of correcting the pitch irregularity error in the sub scanning direction caused by the division error of the deflecting-reflecting surface of a rotatable polygonal mirror, not shown, and causing the parallel light beams from the collimator lens 2 to be imaged on the surface of a drum-like photosensitive member 9 which is the surface 8 to be scanned. Also, a plurality of light beams enter and emerge from the cylindrical lens 7.

When in the present embodiment, the focal length of the collimator lens 2 in the sub scanning direction is $f_1$ and the focal length of the cylindrical lens 7 in the sub scanning direction is $f_2$, the imaging lateral magnification $\beta$ in the entire sub scanning directions is $\beta = f_2/f_1$ because the scanning lens 5 is afocal in the sub scanning direction.

Accordingly, the interval $x_2$ between the positions of incidence of the light beams from the two light emitting portions 1a and 1b of the laser oscillator 1 in the sub scanning direction on the surface 8 to be scanned is $x_2 = x_1(f_2/f_1)$.

In the present embodiment, the magnification $\beta$ is made small by setting the scanning lens and other optical elements as previously described, and particularly, the interval $x_2$ between the positions of incidence of the two laser beams on the surface 8 to be scanned is set by specifying each optical element so that $0 < |\beta| \leq 2$. If this condition is departed from, the interval $x_2$ will become too great and it will become difficult to obtain a predetermined resolution.

It is more preferable to set the range of $|\beta|$ so that $0.1 \leq |\beta| \leq 2$. This is because if $|\beta|$ is smaller than 0.1, the cylindrical lens 7 will be too close to the surface 8 to be scanned and interference may result.

Showing specific examples of numerical values, if $x_1 = 0.1$ (mm) and $f_1 = 23.623$ (mm) and $f_2 = 15$ (mm), $x_2 = 0.0635$ (mm).

This corresponds to a resolution 400 DPI (dot/inch) in the sub scanning direction Also, if $x_1 = 0.1$ (mm) and $f_1 = 23.623$ (mm) and $f_2 = 24.993$, $x_2 = 0.1058$ (mm). This corresponds to a resolution 240 DPI (dot/inch) in the sub scanning direction. At this time, $|\beta| = 1.058$.

Also, if $x_1 = 0.06$ (mm) and $f_1 = 23.623$ (mm) and $f_2 = 41.655$ (mm), $x_2 = 0.1058$ (mm). This corresponds to a resolution 240 DPI (dot/inch) in the sub scanning direction. At this time, $|\beta| = 1.763$.

In the present embodiment, the diameter of the stop 3 may be made to differ between the sub scanning direction and the main scanning direction, for example, to differ as between widths $Y_1$ and $Y_2$, and the emergent light beam may be made to enter the deflecting-reflecting surface 4a of the light deflector with the diameter thereof being made elliptical or rectangular.

Also, in the present embodiment, the cylindrical lens 7 has a relatively short focal length and therefore, if a laser beam of a large diameter is made to enter the cylindrical lens 7, the spot diameter on the surface 8 to be scanned will become too small and the depth of focus will become shallow. Therefore, in the present embodiment, as shown in FIGS. 4A and 4B, the width of the stop 3 in the sub scanning direction is made smaller than the width thereof in the main scanning direction. By making the diameter of the light beam in the sub scanning direction small, balance is kept between the magnitudes of the spot diameters in the main scanning direction and the sub scanning direction on the surface to be scanned.

To contrive the effective utilization of the laser beam in the present invention, it is preferable to make the diameter of the laser beam in the sub scanning direction small by the use of an optical system. For this purpose, it is preferable to use the light beam from the collimator lens 2 with the diameter thereof in the sub scanning direction made small by the cylindrical lens 21 of an afocal system comprising a positive lens 21a and a negative lens 21b having a refractive power in the sub scanning direction, as shown, for example, in FIGS. 5A and 5B. If such a method is used, it will be possible to keep balance between the spot diameters in the main scanning direction and the sub scanning direction while preventing the lose of the quantity of light of the light beam.

Figure 5A:
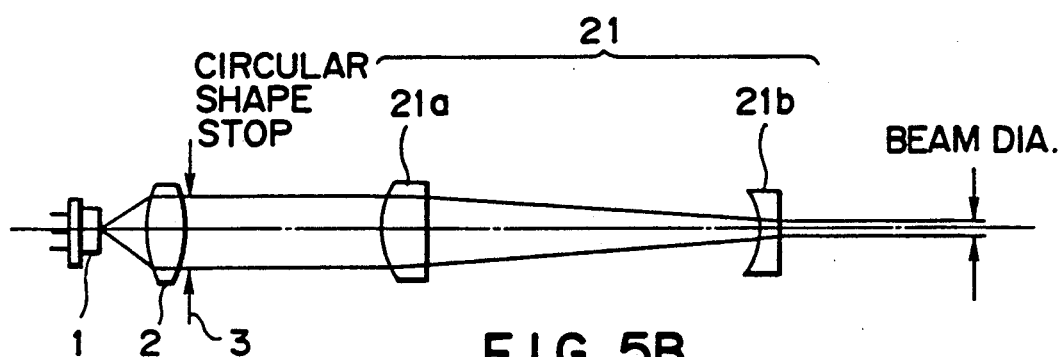
FIGS. 5A and 5B and FIG. 6 are schematic views of an embodiment wherein portions of FIGS. 4A and B are modified.
Figure 5B:
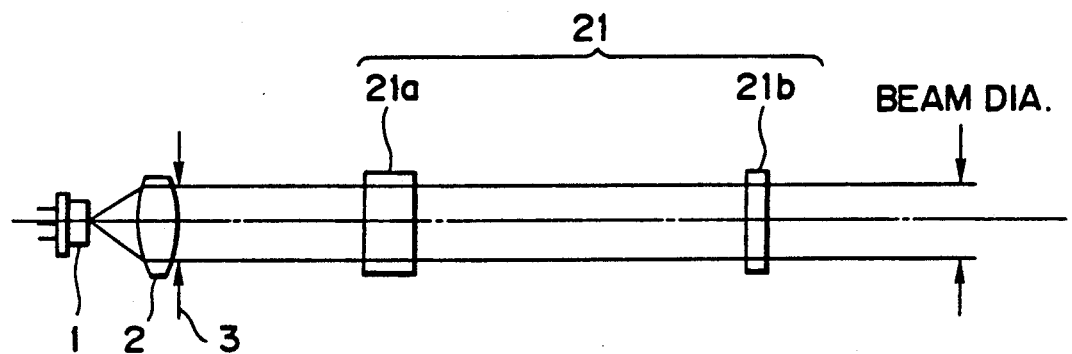

FIG. 5A is a cross-sectional view in the sub scanning direction, and FIG. 5B is a cross-sectional view in the main scanning direction.

Figure 6:
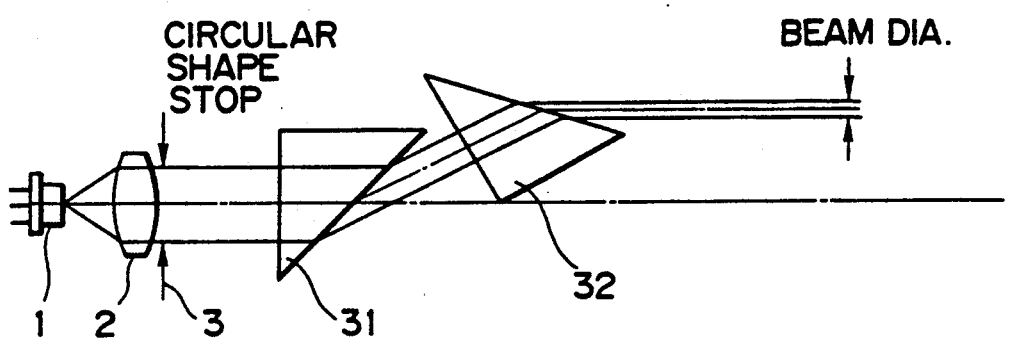

Also, as shown in FIG. 6, two prisms 31 and 32 may be used to make the diameter of the light beam in the sub scanning direction small.

Figures 7A, 7B:
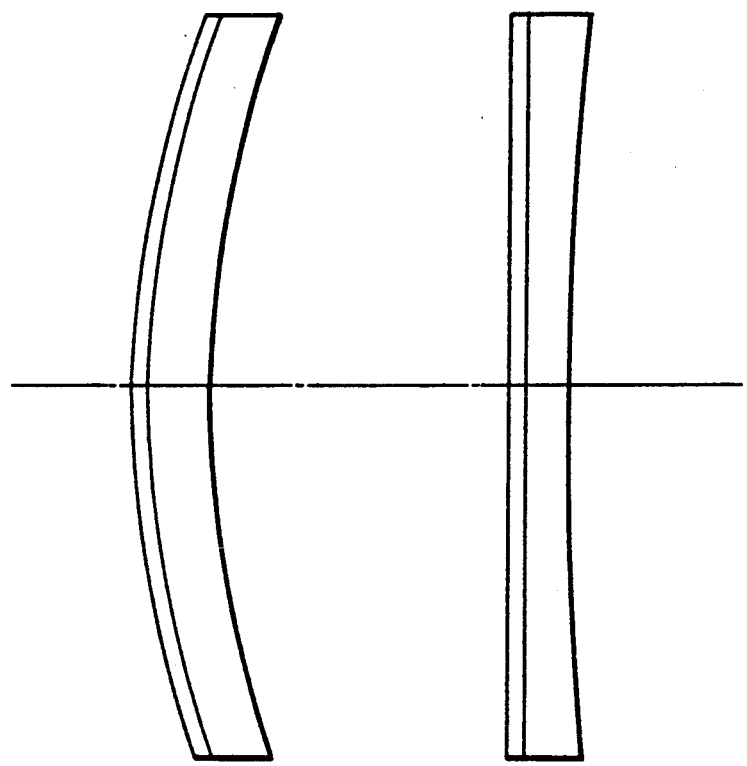
FIGS. 7A and 7B are cross-sectional views of anamorphic lenses to be used instead of the cylindrical lens in another embodiment according to the present invention.

In order to maintain the optical aberrations and angle characteristic in the scanning area good, the cylindrical lens 7 may be comprised of anamorphic lenses differing in imaging magnification between the main scanning direction and the sub scanning direction and having a toroidal surface or a toric surface, as shown, for example, in FIGS. 7A and 7B. Also, those lenses may be constructed with curvatures added to both surfaces thereof.

Where an anamorphic lens having a toric surface is used, correction of the curvature of the image field of the scanning line is possible.

Also, if the scanning lens 5 is afocal or nearly afocal as a whole in the sub scanning direction, the lenses 5a and 5b may be constructed so as to have a single refractive power singly.

According to the present invention, there can be achieved an optical scanning device of a high optical performance in which an anamorphic optical system is used in a portion of the scanning optical system to make the imaging lateral magnification in the sub scanning direction in the entire scanning optical system small to thereby facilitate the use of a monolithic multibeam light source and reduce the influence of asymmetry such as the bending of the scanning line or curvature of the image field, thus facilitating the adjustment of the entire device.

I claim:

1. An optical scanning device comprising:
    a light source having a plurality of light emitting portions arranged in a sub scanning direction;
    optical means, disposed between said light source and a predetermined surface, for directing a plurality of light beams from said light source onto the predetermined surface; and
    a deflector for deflecting the plurality of light beams from said light source and scanning them on the predetermined surface;
    wherein said optical means are disposed to satisfy the following condition:

$$0 < |\beta| \leq 2,$$

where $\beta$ is the imaging lateral magnification from said light source to the predetermined surface through said optical means in the sub scanning direction.

2. An optical scanning device according to claim 1, wherein said plurality of light emitting portions are provided on a common substrate.

3. An optical scanning device according to claim 1, wherein said optical means are disposed to further satisfy the following condition:

$$0.1 \leq |\beta|.$$

4. An optical scanning device comprising:
    a light source having a plurality of light emitting portions arranged in a sub scanning direction;
    first optical means for directing a plurality of light beams from said light source to a deflector;
    a deflector for deflecting the plurality of light beams from said first optical means;
    second optical means for directing the plurality of light beams from said deflector to a third optical means, said second optical means being afocal in the sub scanning direction and having the f-$\theta$ characteristic in a main scanning direction; and
    third optical means, provided commonly for the plurality of light beams, for directing the plurality of light beams from said second optical means onto a predetermined surface, said third optical means being anamorphic and having different imaging magnifications in the main scanning direction and the sub scanning direction.

5. An optical scanning device comprising:
    a light source having a plurality of light emitting portions arranged in a sub scanning direction;
    first optical means for directing a plurality of light beams from said light source to a deflector;
    a deflector for deflecting the plurality of light beams from said first optical means;
    second optical means for directing the plurality of light beams from said deflector to a third optical means, said second optical means being afocal in the sub scanning direction; and
    third optical means, provided commonly for the plurality of light beams, for directing the plurality of light beams from said second optical means onto a predetermined surface, said third optical means being anamorphic and having different imaging magnifications in the main scanning direction and the sub scanning direction;
    wherein said first and third optical means are disposed to satisfy the following condition:

$$0 < |f_2/f_1| \leq 2.$$

where $f_1$ is the focal length of said first optical means in the sub scanning direction, and $f_2$ is the focal length of said third optical means in the sub scanning direction.

6. An optical scanning device comprising:
    a light source having a plurality of light emitting portions arranged in a sub scanning direction;
    first optical means for directing a plurality of light beams from said light source to a deflector;
    a deflector for deflecting the plurality of light beams from said first optical means;

a stop provided between said first optical means and said deflector for limiting the diameters of the light beams;

second optical means for directing the plurality of light beams from said deflector to a third optical means, said second optical means being afocal in the sub scanning direction and having the f-θ characteristic in a main scanning direction; and third optical means, provided commonly for the plurality of light beams, for directing the plurality of light beams from said second optical means onto a predetermined surface, said third optical means being anamorphic and having different imaging magnifications in the main scanning direction and the sub scanning direction.

7. An optical scanning device according to claim 6, wherein said stop has a smaller width in the sub scanning direction than in the main scanning direction.

8. An optical scanning device comprising:
a light source having a plurality of light emitting portions arranged in a sub scanning direction;
first optical means for converting a plurality of light beams from said light source into parallel light beams and directing them to a second optical means;

second optical means for directing the plurality of light beams from said first optical means to a deflector, said second optical means converting the parallel light beams from said first optical means into parallel light beams having reduced diameters in the sub scanning direction;

a deflector for deflecting the plurality of light beams from said second optical means;

third optical means for directing the plurality of light beams from said deflector to a fourth optical means, said third optical means being afocal in the sub scanning direction and having the f-θ characteristic in a main scanning direction; and a fourth optical means, provided commonly for the plurality of light beams, for directing the plurality of light beams from said third optical means onto a predetermined surface, said fourth optical means having different focal lengths in the main scanning direction and the sub scanning direction.

* * * * *

UNITED STATES PATENT AND TRADEMARK OFFICE
CERTIFICATE OF CORRECTION

PATENT NO. : 5,008,686
DATED : April 16, 1991
INVENTOR(S) : HIROSHI SAITO

It is certified that error appears in the above-identified patent and that said Letters Patent is hereby corrected as shown below:

SHEET 1 OF 5

FIG. 1A, "DERECTION" should read --DIRECTION--.

COLUMN 1

Line 24, "arrow" should read --the arrow--.
    Line 45, "deffec-" should read --deflec- --.
    Line 59, "the" should read --The--.

COLUMN 2

Line 11, "but" should be deleted.
    Line 46, "image the" should read --the image--.
    Line 56, "the" (second occurrence) should be deleted.

COLUMN 5

Line 20, "lose" should read --loss--.
    Line 43, "power singly." should read --power.--.

UNITED STATES PATENT AND TRADEMARK OFFICE
CERTIFICATE OF CORRECTION

PATENT NO. : 5,008,686
DATED : April 16, 1991
INVENTOR(S) : HIROSHI SAITO

It is certified that error appears in the above-identified patent and that said Letters Patent is hereby corrected as shown below:

COLUMN 6

Line 56, "$0 < |f_2/f_1| \geqq 2$" should read --$0 < |f_2/f_1| \leqq 2$--.

Signed and Sealed this

Twenty-fourth Day of November, 1992

Attest:

DOUGLAS B. COMER

Attesting Officer

Acting Commissioner of Patents and Trademarks